(12) United States Patent
Fukuyama

(10) Patent No.: US 7,885,285 B2
(45) Date of Patent: Feb. 8, 2011

(54) PROBABILISTIC ROUTING FOR VEHICULAR AD HOC NETWORK

(75) Inventor: Junichiro Fukuyama, Sunnyvale, CA (US)

(73) Assignee: Toyota Infotechnology Center Co., Ltd., Tokyo (JP)

( * ) Notice: Subject to any disclaimer, the term of this patent is extended or adjusted under 35 U.S.C. 154(b) by 49 days.

(21) Appl. No.: 12/240,606

(22) Filed: Sep. 29, 2008

(65) Prior Publication Data

US 2010/0080168 A1 Apr. 1, 2010

(51) Int. Cl.
| | |
|---|---|
| H04L 12/54 | (2006.01) |
| H04L 12/26 | (2006.01) |
| H04L 12/66 | (2006.01) |
| H04L 12/28 | (2006.01) |
| G06F 15/173 | (2006.01) |
| H04B 1/034 | (2006.01) |

(52) U.S. Cl. .................. 370/428; 370/230; 370/356; 370/389; 709/238; 455/99

(58) Field of Classification Search .............. 370/400, 370/401; 340/903, 998, 995.22; 709/223
See application file for complete search history.

(56) References Cited

U.S. PATENT DOCUMENTS

| | | | | |
|---|---|---|---|---|
| 5,311,173 | A * | 5/1994 | Komura et al. | 340/995.22 |
| 5,493,294 | A * | 2/1996 | Morita | 340/988 |
| 7,333,026 | B2 * | 2/2008 | Hunzinger | 340/903 |
| 7,475,130 | B2 * | 1/2009 | Silverman | 709/223 |
| 7,499,675 | B2 * | 3/2009 | Tsuzuki et al. | 455/73 |
| 7,751,390 | B2 * | 7/2010 | Mosko et al. | 370/389 |
| 2002/0120388 | A1 * | 8/2002 | Bullock | 701/117 |
| 2004/0030670 | A1 * | 2/2004 | Barton | 707/1 |
| 2004/0252637 | A1 * | 12/2004 | Laberteaux | 370/216 |
| 2005/0134440 | A1 * | 6/2005 | Breed | 340/435 |
| 2007/0195808 | A1 * | 8/2007 | Ehrlich et al. | 370/408 |
| 2007/0271029 | A1 * | 11/2007 | Tzamaloukas | 701/200 |
| 2008/0062901 | A1 * | 3/2008 | Kadowaki et al. | 370/310 |
| 2009/0105942 | A1 * | 4/2009 | Lin et al. | 701/202 |
| 2009/0299857 | A1 * | 12/2009 | Brubaker | 705/14.66 |
| 2009/0310608 | A1 * | 12/2009 | Chen et al. | 370/389 |
| 2010/0080168 | A1 * | 4/2010 | Fukuyama | 370/328 |

OTHER PUBLICATIONS

Zhao et al. (VADD: Vehicle-Assisted Data Delivery in Vehicular Ad-Hoc Networks—May 2008).*

(Continued)

*Primary Examiner*—Jayanti K Patel
*Assistant Examiner*—Christopher T Wyllie
(74) *Attorney, Agent, or Firm*—Patent Law Works LLP

(57) ABSTRACT

A probabilistic method of determining a second vehicle in the VANET to which a packet is to be forwarded from a first vehicle is provided. The method includes determining the second vehicle to forward the packet from the first vehicle based on pre-calculated expected latency data corresponding to the second vehicle, and forwarding the packet from the first vehicle to the determined second vehicle. The expected latency data is indicative of the latency expected for communication of the packet from the first vehicle to the destination if the packet is forwarded from the first vehicle to the second vehicle, and is calculated in advance of the step of the determining the second vehicle to forward the packet. The second vehicle to forward the packet may also be determined based on pre-calculated communication probability data corresponding to the second vehicle in addition to the pre-calculated expected latency.

16 Claims, 6 Drawing Sheets

OTHER PUBLICATIONS

Karp et al. (GPSR: Greedy Perimeter Stateless Routing for Wireless Networks—2000).*

Baldessari, R. et al., "Flexible Connectivity Management in Vehicular Communication Networks", Proceedings of 3rd International Workshop on Intelligent Transportation (WIT), Mar. 2006, Hamburg, Germany, pp. 211-216.

Karp, B. et al., "GPSR: Greedy Perimeter Stateless Routing for Wireless Networks", Proceedings of the Sixth Annual ACM/IEEE International Conference on Mobile Computing and Networking (MobiCom 2000), Aug. 2000, Boston, Massachusetts, pp. 243-254 (12 pages).

Killat, M. et al., "Enabling Efficient and Accurate Large-Scale Simulations of VANETs for Vehicular Traffic Management", Proceedings of 4th ACM Int. Workshop on Vehicular Ad Hoc Networks (VANET) 2007, Sep. 10, 2007, Montreal, Canada, pp. 29-38.

Kumar, D. et al., "Route Lifetime Based Optimal Hop Selection in VANETs on Highway: An Analytical Viewpoint", In Proceedings of Networking 2006, Coimbra, Portugal, Lecture Notes in Computer Science, Springer, May 15-19, 2006, vol. 3976, pp. 799-814.

Vahdat, A. et al., "Epidemic Routing for Partially-Connected Ad Hoc Networks", Technical Report CS-200006, 2000, 14 pages.

Wu, H. et al., "MDDV: A Mobility-Centric Data Dissemination Algorithm for Vehicular Networks", Proceedings of VANET '04, Oct. 1, 2004, Philadelphia, Pennsylvania, 10 pages.

Zhao, J. et al., "VADD: Vehicle-Assisted Data Delivery in Vehicular Ad Hoc Networks", IEEE Transactions on Vehicular Technology, 2008, 12 pages.

* cited by examiner

PROBABILISTIC ROUTING FOR VEHICULAR AD HOC NETWORK

BACKGROUND OF THE INVENTION

1. Field of the Invention

The present invention relates to routing packets among vehicles for communication in a vehicular ad hoc network (VANET).

2. Description of the Related Arts

Vehicular ad hoc networks (VANETs) are often used for wireless communications from a communication source to a communication destination. A VANET is a communication network that is comprised of moving cars with wireless communication devices. In a VANET, packets are passed on from a source to a destination via wireless communication devices on one or more vehicles. The destination is often a roadside unit (RSU) that facilitates wireless communication, such as a base station used for cellular telephone communication. Moving cars are often equipped with communication radio devices that exchange data with the RSUs.

However, the area in which such vehicles move around is much wider than the transmission range of the communication radio devices in the vehicles. For example, the following parameters may be assumed: (i) the area in which the vehicles move around is typically 2-5 km$^2$ and has at most 10 RSU's; (ii) the speeds of the cars are about 30 miles/hour on the average and 45 miles/hour maximum; and (iii) the transmission range of the radio devices are about 200-250 meters. Thus, cars typically cannot send or receive data to/from an RSU by a single hop. Transmission of packets between a car and a destination RSU is typically carried out by multi-hop transmission over vehicle-to-vehicle communication. If there are 9 RSU's in a 3 km$^2$ area, one RSU roughly covers 1 km$^2$. So it would take about 5 hops (=1 km/200 m per hop) for a packet to reach an RSU.

One conventional technique for routing packets from a source to a destination in a VANET is geographic forwarding. Geographic forwarding routes packets from one car to another car based on how close the cars are to the destination d, and passes the packets to the car(s) that are geographically the closest to the destination d. In other words, the main criterion to prioritize the nearby cars for packet forwarding is their Euclidean distance to the destination d. Geographic forwarding has the advantage of fast computational speed per hop that occasionally results in short latency, since it is relatively simple to calculate the distance to destination d for every car in the proximity. However, geographic forwarding may not always select the most reliable routing path. For example, FIG. 1 illustrates a variety of routing possibilities in a VANET. According to the geographic forwarding method, Car A is selected as the next car to "hop" from source car 102, because Car A is geographically closes to the destination RSU 104. However, the vehicle for the next hop from Car A is not at an optimal position, and the geographic forwarding method will thus result in a large number of hops and large latency for complete transmission to destination RSU 104.

Another conventional technique called MDDV improves geographical forwarding by using trajectory based forwarding and opportunistic forwarding in addition to the conventional technique of geographic forwarding. Trajectory based forwarding first determines an approximate trajectory from the source to the destination on the map, and then only consider the cars that roughly follow the trajectory for the next hop. Opportunistic forwarding chooses some cars that meet certain predetermined conditions to give them the right to broadcast the packet in the proximity. By use of trajectory based forwarding and opportunistic forwarding in addition to geographic forwarding, MDDV can achieve good latency and delivery ratio, especially for arterial roads or highways where cars typically run in the same direction in general. However, MDDV may not work well in a VANET with cars driving in non-arterial roads. For example, referring to FIG. 1, Car B may be selected as the car for the next hop from source 102 to destination RSU 104, because Car B is the second closest from source vehicle 102 and is on the shortest trajectory from source vehicle 102 to destination RSU 104. However, the traffic ahead of Car B is too sparse and is thus may not be the ideal choice for complete transmission of the packet from source vehicle 102 to destination RSU 104 with short latency.

Other conventional techniques for VANET routing also suffer from other disadvantages, such as large computational time in a moving car or inefficient routing.

SUMMARY OF THE INVENTION

Embodiments of the present invention include a method of routing packets in a VANET based on parameters such as communication probability and/or expected latency that are pre-computed prior to run-time, based on hypothetical map locations at which vehicles may be placed in a VANET. In one embodiment, a method of determining a next vehicle among a plurality of vehicles in the VANET to which the packet is to be forwarded from the source vehicle is provided. The method comprises determining a second vehicle to forward the packet from a first vehicle based on pre-calculated expected latency data corresponding to the next vehicle, and forwarding the packet from the first vehicle to the determined second vehicle. The expected latency data is indicative of the latency expected for communication of the packet from the first vehicle to the destination if the packet is forwarded from the first vehicle to the second vehicle, and is calculated in advance of the step of the determining the second vehicle to forward the packet. In one embodiment, a utility function may be applied to the pre-calculated expected latency data corresponding to a plurality of vehicles in the VANET located within a transmission range of a wireless communication device of the first vehicle to obtain a plurality of real numbers each corresponding to the plurality of vehicles, and at least one of the plurality of vehicles may be selected as the second vehicle to which the packet is forwarded based on the real numbers.

In another embodiment, the second vehicle to forward the packet is determined also based on pre-calculated communication probability data corresponding to the second vehicle in addition to the pre-calculated expected latency. The communication probability data indicates the probability that there exists a communication path from the first vehicle to neighbors of the destination within a transmission range of a wireless communication device of the first vehicle, within a predetermined time and within a predetermined number of hops between vehicles in the VANET, if the packet is forwarded from the first vehicle to the second vehicle.

The probabilistic routing method according to various embodiments of the present invention has the advantage that the communication probability and the expected latency over the entire forwarding path from the source to the destination are considered for determining to which vehicle in the VANET packets should be forwarded from the current source vehicle. Such probabilistic method is both fast and reliable, and does not require a burdensome amount of computation in the moving source vehicle.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

A VANET routing method according to various embodiments of the present invention computes the "communication probability" that it is possible to forward a packet from a source s to a destination d in advance of the run-time at which such forwarding decision is made. Such communication probability is pre-calculated in advance of the run-time at which VANET routing decisions are made, based on hypothetical locations at which vehicles may be placed in a VANET, for every hypothetical source locations and destination location, and stored for use in making packet routing decisions later on at run-time. The VANET routing decision is made based on a variety of factors, including the expected latency of communication that depends on such communication probability and upon the locations of the vehicles.

Figure 1:
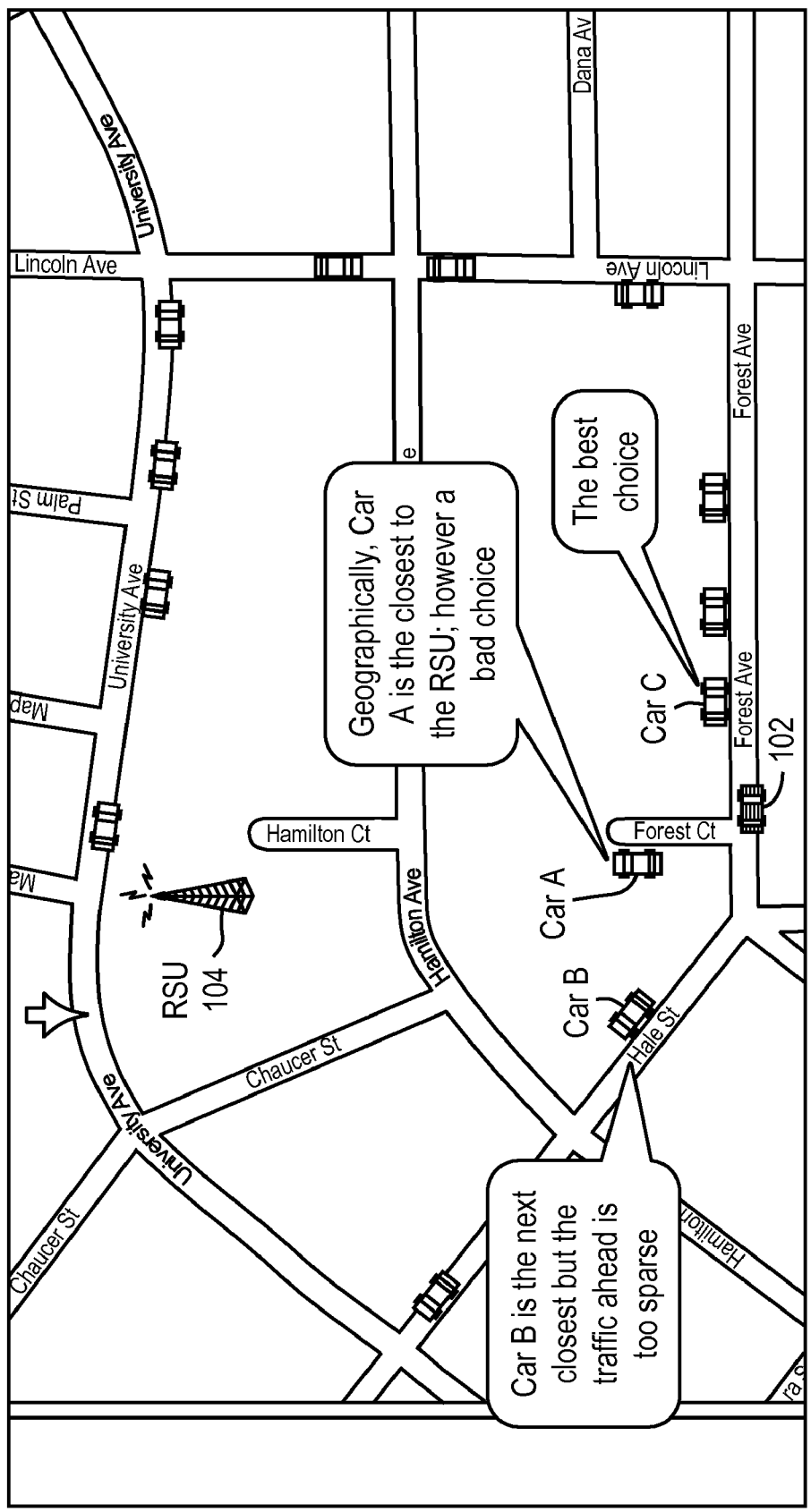
FIG. 1 illustrates a variety of routing possibilities in a VANET.
Figure 2:
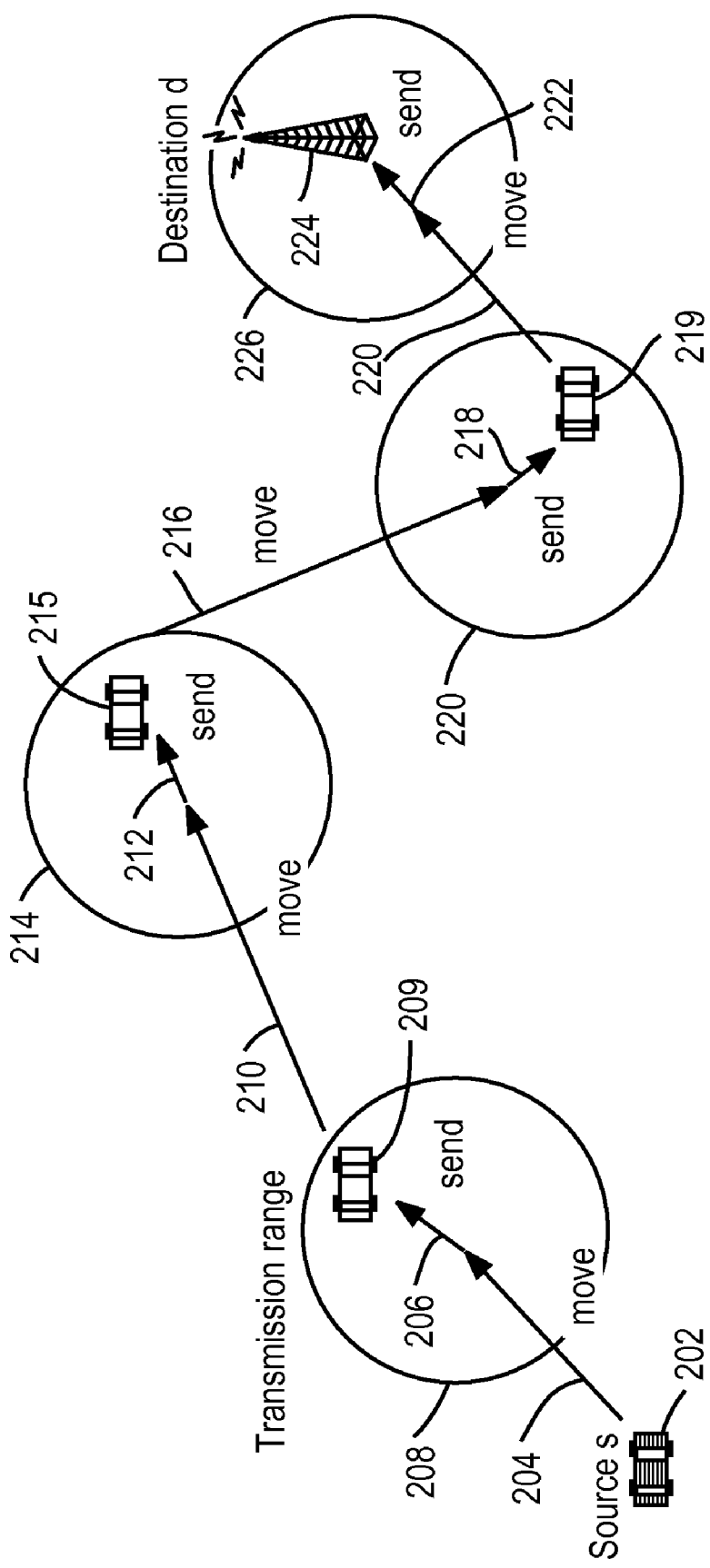
FIG. 2 illustrates a VANET in which packets are forwarded from source s to destination d via one or more cars, according to one embodiment of the present invention.

FIG. 2 illustrates a VANET in which packets are forwarded from source s to destination d via one or more cars, according to one embodiment of the present invention. Assume for simplicity that two cars can communicate through radio (wireless communication) whenever they are within a given transmission range R to each other. Also, cars in the VANET are equipped with GPS (Global Positioning System) devices (see FIG. 4) for determining its current location, and the cars broadcast its current location to other vehicles in the vicinity using such radio in the form of beacon signals (also referred to as "heartbeat messages"). The transmission range of such beacon signals is same as the radio transmission range R, typically 150-250 m.

With this simplification, the communication from source s 202 to destination d 224 is possible if there is a sequence of cars to forward the packet from source s 202 to destination d 224. Such a sequence is referred to as "communication path" in a VANET. Initially, the source s may also be referred to herein as the "current packet holder," and the next car to which the packet is to be forwarded and carry the packet may also be referred to as the "subsequent packet holder." For example, the communication path in the example shown in FIG. 2 is source s 202, car 209, car 215, car 219, and destination d 224. The "communication probability" is the probability that there exists a communication path from s to d. Source s 202 is the current packet holder, and the next car in the vicinity of car 202 to which the packet is forwarded is the subsequent packet holder, which in this example of FIG. 2 is car 209. Note the terms "current packet holder" and "subsequent packet holder" are relative terms, such that once the packet is forwarded from the current packet holder to the subsequent packet holder in the vicinity of the current packet holder, such subsequent packet holder becomes the new "current packet holder" which should determine the next "subsequent packet holder." Thus, once the packet is forwarded from source s 202 to car 209, car 209 now becomes the current packet holder and car 215 will become the subsequent packet holder, and so on. As will be explained in more detail below, the present invention uses an efficient algorithm for computing the communication probability Mathematical Notations First, certain mathematical notions used to explain the routing method of the present invention are set forth below. Assume that every considered object is on a map M that is a graph whose vertices are positions, and edges are roads. Denote by x a position on M, for which x∈M (instead of x∈V(M)). x is a two-dimensional vector that represents each location in map M. Let m be the number of positions in M. m may be typically 100 to 5000. Let R be the transmission range of the radio used in the wireless communication devices of each car. It is assumed that any two cars within the distance R can communicate with each other, although this assumption will be modified below in explaining Algorithm-3 below. For simplicity of modeling, assume that map M is a square $\sqrt{m} \times \sqrt{m}$ grid graph, and R is an integer representing the Manhattan distance in M. A position x'∈M is referred to as an R-neighbor of x∈M if the Manhattan distance from x to x' is at most R.

Consider time t=0, 1, 2, . . . , T where the unit time 1 typically represents 0.1 seconds to few seconds and T is the time limit within which the communication of the packet needs to be completed. To express that a car is at position x∈M and time t, it is convenient to couple t with x. A space-time u=(x, t) is meant to be such pairing of position and time. A "hop" is defined herein to be a pair h=($u_1$, $u_2$) of space-times. A "hop" means that a car appears at $u_1$=($x_1$,$t_1$) (i.e., it is seen at position $x_1$∈M when the time is $t_1$≦T), and moves to $u_2$=

$(x_2,t_2)$. $x_1$ and $x_2$ are the source and destination, respectively, of the hop, and $t_1$ and $t_2$ are the start time and arrival time, respectively, of the hop.

A "hop" is represented in FIG. 2 as the arrows 204, 210, 216, 220, indicative of the movements or "hops" of the cars 202, 209, 215, 219. Arrows 206, 212, 218, and 222 indicate the transmission of packets from car 202 to car 209, from car 209 to car 215, from car 215 to car 219, and from car 219 to destination d 224, respectively. A "communication path" can be mathematically represented as a sequence $P=(h_1, h_2, \ldots, h_k)$ of hops $h_i$ such that the start time of $h_{i+1}$ equals the arrival time of $h_i$, and the source of $h_{i+1}$ is an R-neighbor of the destination of $h_i$, for every i<k where the integer k is the number of hops. k should be limited to at most the given maximum number H of hops. In FIG. 2, all 8 arrows 204, 206, 210, 212, 216, 218, 220, 222 form a communication path. It is also possible to state that P is a communication path from u to u', where u is the first space-time of $h_1$ and u' is the second one of $h_k$. The arrival time of P is defined as that of u'. Mathematically, the communication probability from a source s∈M to a destination d∈M is the probability that there exists a communication path from u to u', where u=(s, 0) and u'=(x, t) are space-times such that x is an R-neighbor of d and t≦T.

Algorithm for Determining Communication Probability

In order to compute the communication probability, certain input data is needed, including T (time limit within which communication should be completed), H (maximum number of hops within which communication should be completed), M (a map with m positions), R (transmission range of the radio devices in each car), P $(u_1,u_2)$ (the hop probability that there is a car that appears at $u_1$ and moves to $u_2$), and s, d∈M (source and destination, respectively, on the map M). According to the present invention, the communication probability is calculated as a function of the hop probabilities for every hypothetical position m on the map M under a mathematical hypothesis that assumes the probabilistic independence of having communication paths.

Algorithm-1 for computing the communication probability, $\rho$(s, d, T), according to one embodiment of the present invention is set forth below. In Algorithm-1 below, the final value of Answer (x, t, k) will be the probability that there exists a communication path from (s, 0) to (x, t) with at most k hops:

[Algorithm-1]

begin
1. for every position x ∈ M and time t ≦ T, do Answer (x, t, 0) = 0;
2. Answer (s, 0, 0) = 1;
3. for k = 1 to H do
   3-1. for every space-time (x, t) do
      3-1-1. Answer(x, t, k) = P((s, 0), (x, t));
      3-1-2. for every other space-time (x', t') such that t' ≦ t and every R-neighbor $x_R$ of x' do
         3-1-2-1. p = Answer (x', t', k − 1) · P(($x_R$, t'), (x, t));
         3-1-2-2. Answer (x, t, k) = Answer (x, t, k) (1 − p) + p;
      3-1-3. end
   3-2. end
4. end 5. return $\rho$(s, d, T) = $1 - \prod_{\substack{d_R \in D \\ t \le T}} (1 - \text{Answer}(d_R, t, H))$, where D is the set of all R-neighbors of d;

end

The generally formulated problem of finding the communication probability is far from polynomially computable, and takes asymptotic running time that grows exponentially in the problem size n+m+T. In this regard, it will be assumed that the traffic is in steady state in computing the communication probability above, which means that (i) two cars can send/receive a packet whenever their distance does not exceed the transmission range R (Assumption-1), and (ii) when (u, k) denotes the event that there exists a communication path from (s, 0) to u with at most k hops, for each k≦H, (u, k) is collected for all the possible space-times u, where each event is assumed to be independent of each other, i.e., their probabilities are not affected by each other's occurrence (Assumption-2). The probabilistic routing method of the present invention computes the communication probability under Assumption-2 and may also compute the communication probability under both Assumption-1 and Assumption-2.

Measure Hop Probability from Field Data

As explained above, the primary input to Algorithm-1 for computing the communication probability is hop probabilities $P(u_1,u_2)$ for all possible (hypothetical) hops $(u_1,u_2)$ in the map M. In one embodiment, the hop probabilities are obtained using a traffic simulator such as VISSIM. In such a simulation bed, the probability $P(A,u_1,u_2)$ of each car A∈C to appear at $u_1$ and move to $u_2$, can be simply calculated, where C is the set of all the cars. Then, the hop probability $P(u_1,u_2)$ is computed as:

$$P(u_1, u_2) = 1 - \prod_{A \in C} (1 - P(A, u_1, u_2)),$$

assuming that car movements are independent events.

In another embodiment, the following two steps may be used to calculate the hop probability $P(u_1,u_2)$. First, the intersection probabilities are measured. Some nodes v on the map M correspond to intersections of roads on the map. The edges l and l' from intersection v are the roads from intersection v. The intersection probability Q(l,l',v) is the probability that a car moves from the road l to another road l' at the intersection v. This quantity of the intersection probability Q(l,l',v) is measured from real field data, by simply finding the ratio of the cars that choose the road l' out of all the cars running toward intersection v on road l. Second, the hop probability $P(u_1,u_2)$ is calculated. This is done by executing Algorithm-2 below for a number of times:

[Algorithm-2]

1-1. Fix each hop($u_1$, $u_2$) and Car A. Let $u_i$ = ($x_1$, $t_i$) for i = 1, 2.
1-2. In time t = 0, 1, 2, . . . , $t_1$, simulate the probabilistic movements of the car using the intersection probabilities determined above, so that the probability of A being at (x, t) is determined for all x ∈ M and t ≦ $t_1$. In the end, the probability of A being at $u_1$ = ($x_1$, $t_1$) is determined and stored into $p_1$.
1-3. Fix the position of A at t = $t_1$ as $x_1$. Simulate the probabilistic movements of A in time t = $t_1$ + 1, $t_1$ + 2, . . . , $t_2$. Find the probability of A being at ($x_2$, $t_2$), and store it into $p_2$.
1-4. P(A, $u_1$, $u_2$) = $p_1 \cdot p_2$ is the probability that A appears at $u_1$ and moves to $u_2$.
1-5. Repeat steps 1-1 through 1-4 for all the cars A ∈ C.

1-6. Calculate the hop probability $P(u_1, u_2) = 1 - \prod_{A \in C} (1 - P(A, u_1, u_2))$.

In each round of execution of Algorithm-2 above, the hop probability $P(u_1,u_2)$ is measured independently, and then averaged in the end to obtain the final value. At the beginning of each round of execution of Algorithm-2, the initial positions of the cars are configured randomly but based on real statistics.

Selection of Next Car to Forward Packet

Figure 3A:
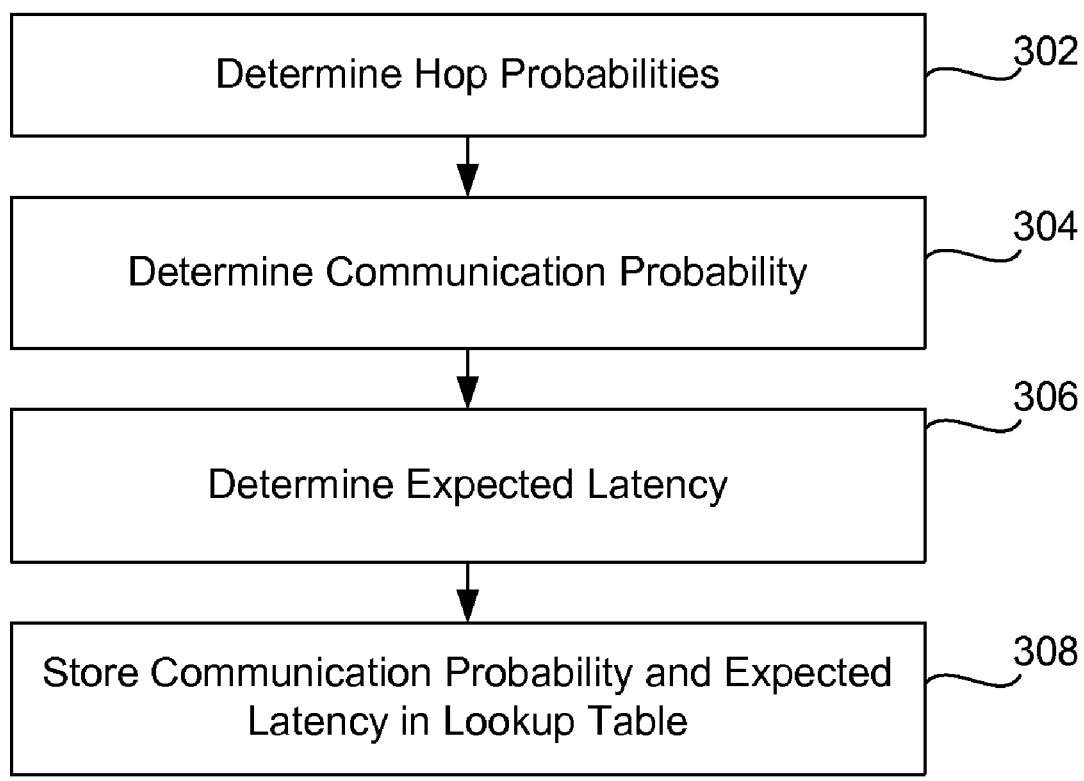
FIG. 3A illustrates a pre-compute phase method of the VANET probabilistic routing method, according to one embodiment of the present invention.

FIG. 3A illustrates a pre-compute phase method of the VANET probabilistic routing method, according to one embodiment of the present invention. In the pre-compute phase of FIG. 3A, the communication probabilities and expected latencies are calculated for all hypothetical locations of the map M in advance prior to run-time when the actual probabilistic routing decisions are made in each running current packet holder vehicle. Specifically, Algorithm-1 for computing communication probabilities from a source s is run beforehand to construct a look-up table that contains the communication probabilities $\rho(s,d,T)$ from s to d with the time limit T for all possible s, d and T. This is based on Assumption-2 above, and can be done in advance since the hop probabilities $P(u_1,u_2)$ are assumed to be constant real numbers. Thus, referring to FIG. 3A, in step 302, the hop probabilities for all hypothetical map locations are determined by any method as described above. And in step 304, the communication probabilities $\rho(s,d,T)$ are computed as explained above, in advance in the pre-computing phase before the vehicles run in the VANET, from s to d with the time limit T for all possible s, d and T on the map M. This communication probability data is calculated in advance in the pre-computing phase before the vehicles run in the VANET.

Next, in step 306, the expected latency time of communication is also computed in advance in the pre-computing phase before the vehicles run in the VANET for all possible s, d and T on the map M. The expected latency time $\tau(s,d)$ may be calculated by:

$$\begin{aligned}\tau(s,d) &= \sum_{t=1}^{T} t(\rho(s,d,t) - \rho(s,d,t-1)) \\ &= 1(\rho(s,d,1) - \rho(s,d,0)) + 2(\rho(s,d,2) - \rho(s,d,1)) + \ldots + \\ &\quad T(\rho(s,d,T) - \rho(s,d,T-1)) \\ &= T\rho(s,d,T) - \sum_{t=0}^{T-1} \rho(s,d,t).\end{aligned}$$

Here $\rho(s,d,t)-\rho(s,d,t-1)$ is the probability that there exists a communication path from s to d with the arrival time exactly t. $\tau(s,d)$ can also be computed statically. This expected latency data for all possible s, d and T on the map M is calculated in advance in the pre-computing phase before the vehicles run in the VANET. Finally, the communication probability data and the expected latency data computed in steps 304, 306 above are stored in step 308 for future use, for example, in the form of a look-up table or any other suitable data structure.

Figure 3B:
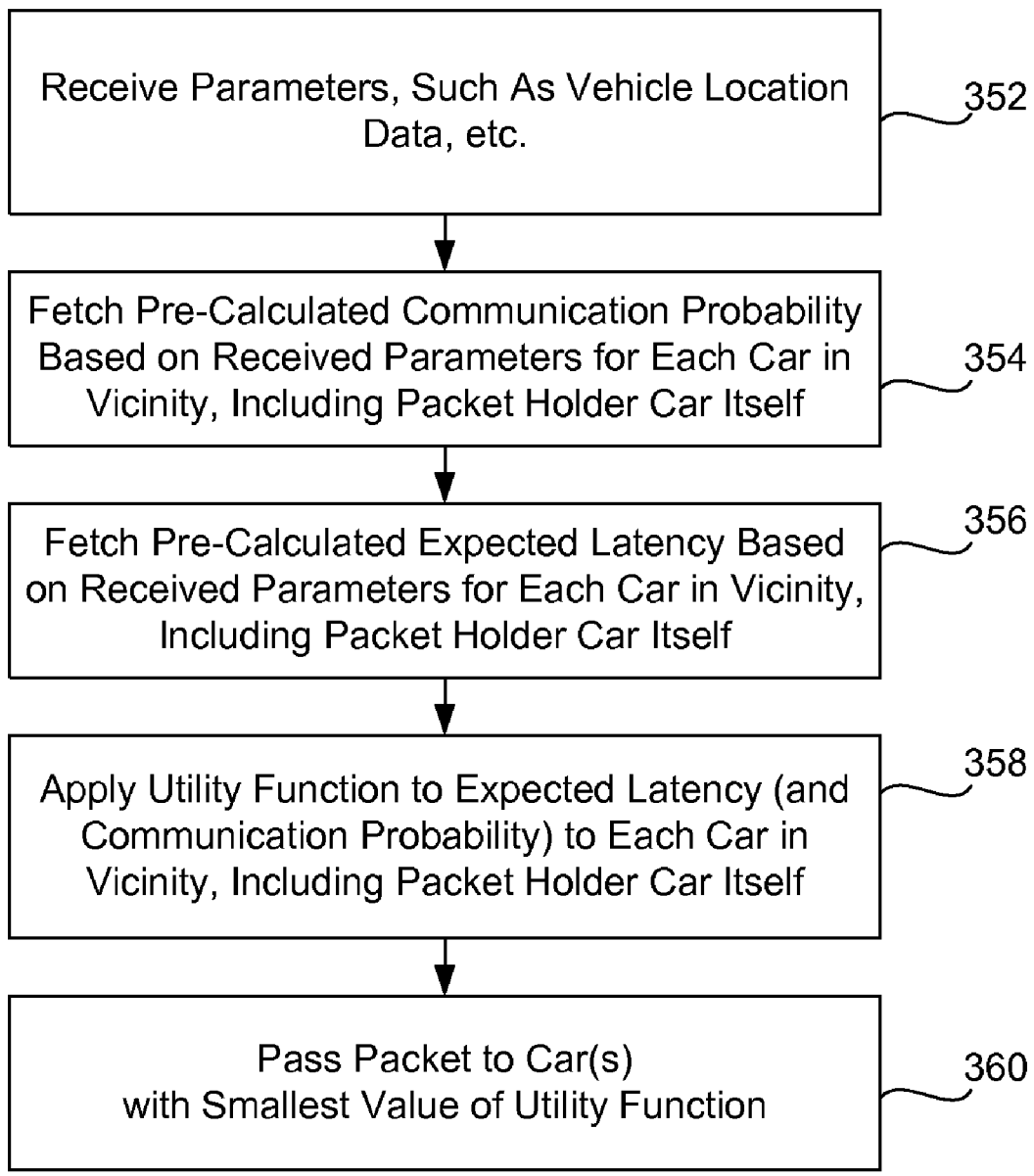
FIG. 3B illustrates a run-time phase method of the VANET probabilistic routing method, according to one embodiment of the present invention.

FIG. 3B illustrates a run-time phase method of the VANET probabilistic routing method, according to one embodiment of the present invention. In the run-time phase of FIG. 3B, routing decisions are made at a moving current packet holder vehicle based on the pre-computed communication probability data and the expected latency data, to determine the subsequent packet holder vehicle to which the packet is to be forwarded. Thus, the method of FIG. 3B is performed at the current packet holder vehicle.

In step 352, a variety of parameters such as the locations of the vehicles in the vicinity of the current packet holder are received from the beacon signals broadcast by the vehicles in the vicinity. In addition to the locations of the vehicles, other parameters such as the vehicle velocity and/or moving directions may also be received. Other parameters such as map data, transmission range data, time limit, etc. can be simply fetched from storage in the current packet holder vehicle. In step 354, the pre-calculated and pre-stored communication probability data are fetched based upon the received parameters for each car in the vicinity of the current packet holder including the current packet holder itself. In step 356, the pre-calculated and pre-stored expected latency data are fetched based upon the received parameters for each car in the vicinity of the current packet holder including the current packet holder itself. Next in step 358, a utility function $f$ is applied to map the parameters such as the expected latency attributed to every nearby car A in the vicinity of the current packet holder, including the current packet holder itself, to a real number. Such a real number represents the evaluation for nearby car A to pass the packet from the current packet holder in the VANET. In one embodiment, nearby cars A correspond to cars that are within the transmission range R of the radio device in the source vehicle.

In one embodiment, the input parameter to the utility function $f$ include the latency $\tau(s,d)$ corresponding to the source location s. In another embodiment, the input parameters to the utility function $f$ include the latency $\tau(s,d)$ and the communication probability $\rho(s,d,T)$ corresponding to the source s, destination d, and the time limit T so that the utility function $f$ reflects the delivery ratio to destination d. In still other embodiments, other parameters may be inputs to the utility function $f$, such as the source location s, destination location d, the moving directions, the trajectory, etc.

The detailed design of the actual utility function may change. For example, in one embodiment, the utility function $f$ may be $f=\tau(x,d)$ where x is the current location of the current packet holder or the cars in the vicinity and d is the location of the destination, and the nearby vehicle with the smallest value of the latency $\tau(x,d)$ is selected as the "subsequent packet holder." In another embodiment, the utility functions may be $f=\alpha\tau(x,d)+(1-\alpha)\rho(x,d,T)$, where $\alpha$ is a positive weight constant less than 1, x is the current location of the current packet holder or the cars in the vicinity, d is the location of the destination, T is the time limit, and $\rho$ is the pre-computed communication probability. The nearby vehicle with the smallest value of the utility function $f$ is selected as the "subsequent packet holder." The constant $\alpha$ is used to weight the expected latency with respect to the communication probability as desired for the particular application, and the weight $(1-\alpha)$ for the communication probability may contribute to the delivery ratio to the destination. In still another embodiment, the utility function $f$ may be $f=\alpha_1\tau(x,d)+\alpha_2\rho(x,d,T)+\alpha_3\Delta(x,d)$, where $\alpha_1$, $\alpha_2$, $\alpha_3$ are positive weight constants, x is the current location of the current packet holder or the cars in the vicinity, d is the location of the destination, T is the time limit, $\rho$ is the pre-computed communication probability, and $\Delta(x,d)$ is the Euclidean distance from the current packet holder x to the destination d. The nearby vehicle with the smallest value of the utility function $f$ is selected as the "subsequent packet holder."

Finally, in step 360, the packet is passed from the current packet holder vehicle to selected subsequent packet holder vehicle, the vehicle(s) with the smallest value of the real number obtained by application of the utility functions in step 308. Note that run-time process of FIG. 3B is performed at every vehicle from which the packet is to be forwarded, i.e., at every "current packet holder." Thus, although source vehicle s is the "the "current packet holder" at the first time the process of FIG. 3B is performed, the "current packet holder" changes every time the packet is forwarded, beginning from the initial source vehicle s in which the packet originated in the VANET to intermediate vehicles in the VANET, until the packet reaches the destination d.

Further Improvements to the Algorithms

Algorithm-1 for computing the communication probabilities may be improved for use with real VANETs. First, recall that the transmission range R was assumed to be uniform above (Assumption-1). However, in real VANETs a car within the transmission range R of another car may still fail to receive the packet transmitted from that other car due to, for example, obstacles between the two cars, contention, poor weather conditions, etc. In other words, the transmissions 206, 212, 218, 222 (see FIG. 2) may fail by a certain probability, even within the transmission range R. In order to take this possibility into account, in one embodiment, Assumption-1 is removed and a 1-hop packet error ratio is estimated as a constant in time, and taken into account when calculating the communication probability. The 1-hop packet error ratio is assumed as a function $\zeta(x,x')$ where $x,x' \in M$ are the source and destination, respectively, whose distance of $\leq R$, of a transmission of a packet, represented with the arrows 206, 212, 218, 222 (FIG. 2). The 1-hop packet error ratio $\zeta(x,x')$ can be measured from field data possibly in conjunction with an analytical formula. With this information, Algorithm-1 can be modified so that the communication probabilities more accurately reflect 1-hop packet error ratios. More specifically, if the assumption of uniform transmission range is eliminated, Algorithm-1 for computing the communication probability is modified as follows in Algorithm-3:

---

[Algorithm-3]

begin
   1. for every position $x \in M$ and time $t \leq T$, do Answer $(x, t, 0) = 0$;
   2. Answer $(s, 0, 0) = 1$;
   3. for k = 1 to H do
     3-1. for every space-time (x, t) do
       3-1-1. Answer(x, t, k) = P((s, 0), (x, t));
       3-1-2. for every other space-time (x', t') such that $t' \leq t$ and every R-neighbor $x_R$ of x' do
         3-1-2-1. p = Answer (x', t', k − 1)(1 − $\xi$(x', $x_R$))P(($x_R$, t'), (x, t));
         3-1-2-2. Answer (x, t, k) = Answer (x, t, k) (1 − p) + p;
       3-1-3. end
     3-2. end
   4. end
   5. return $\rho(s, d, T) = 1 - \prod_{\substack{d_R \in D \\ t \leq T}} (1 - (1 - \xi(d_R, d))$ Answer($d_R$, t, H)), where D is the set of all R-neighbors of d;
end

---

The method of packet routing according to various embodiments of the present invention has the advantage that the communication probability and the expected latency over the entire forwarding path from the source to the destination are considered for determining to which vehicle in the VANET to forward packets from the current packet holder vehicle. Such probabilistic method is both fast and reliable, and does not require a burdensome amount of computation in the moving source vehicle.

Figure 4:
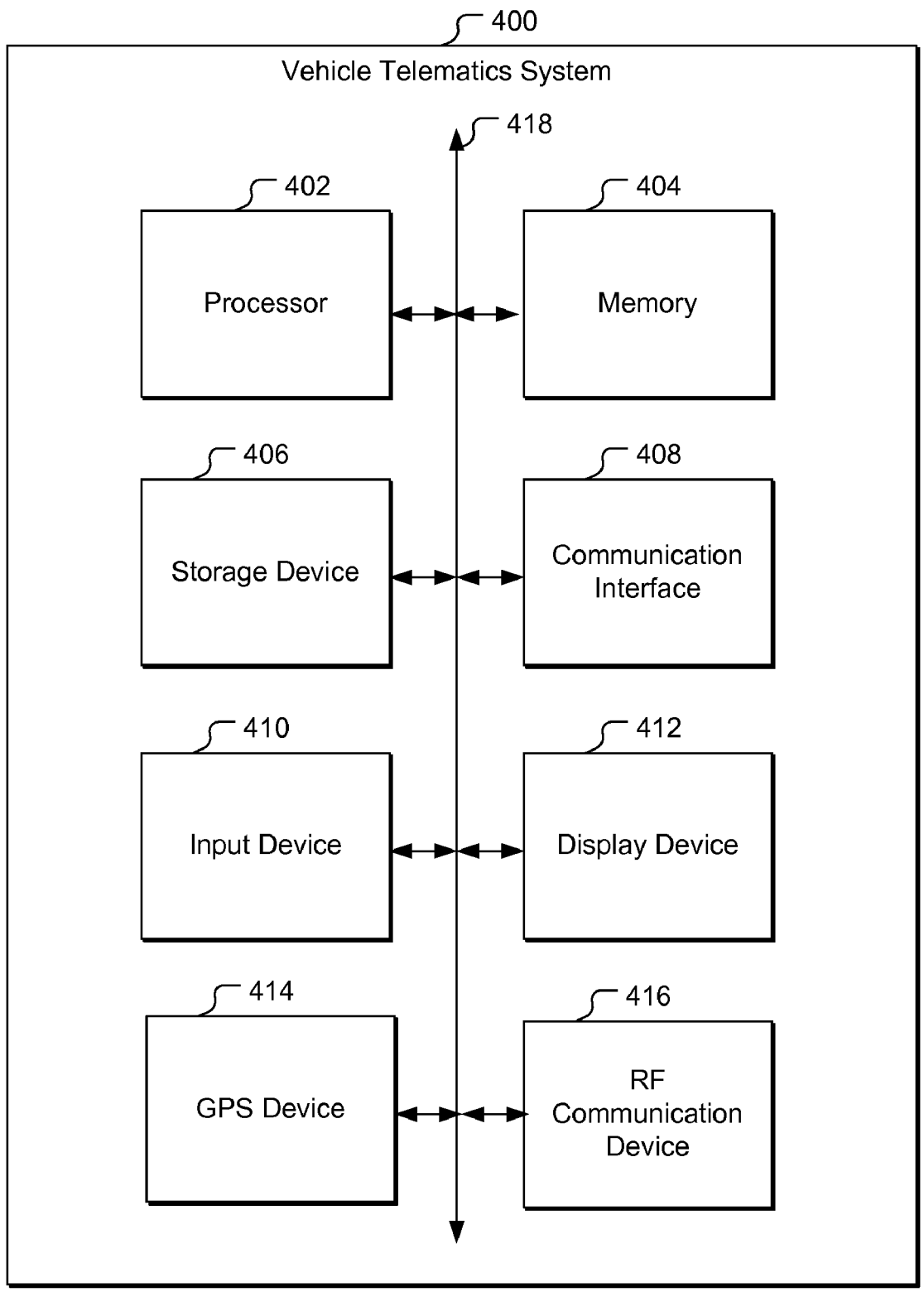
FIG. 4 illustrates the hardware architecture of a vehicle telematics system in which the method of VANET routing is implemented, according to one embodiment of the present invention.

FIG. 4 illustrates the hardware architecture of a vehicle telematics system in which the method of VANET routing is implemented, according to one embodiment of the present invention. As an example, the probabilistic forwarding method of the present invention is implemented in a vehicle telematics system in which wireless communication of data in a VANET is used. However, the probabilistic routing method of the present invention may be implemented in other devices or applications. In one embodiment, the vehicle telematics system 400 includes components such as a processor 402, a memory 404, a storage device 406, a communication interface (e.g., Universal Serial Bus or WiFi interface) 408, an input device (e.g., touch screen) 410, a display device (e.g., liquid crystal display device) 412, a GPS (Global Positioning System) device 414, and a RF communication interface 416, exchanging data and control signals with one another through a bus 418. The processor 402, the communication interface 408, and the display device 412 are standard components that may be found in standard computing devices.

The storage device 406 is implemented as one or more computer readable storage medium (e.g., hard disk drive), and stores software that is run by the processor 402 in conjunction with the memory 403 to implement the probabilistic routing method according to embodiments of the present invention as illustrated herein. Other software corresponding to other vehicle telematics functions may also be stored in the storage device 406 to run on the processor 402. Note that not all components of the vehicle telematics system 400 are shown in FIG. 4 and that certain components not necessary for illustration of the present invention are omitted herein.

GPS device 414 performs standard GPS functions to determine the location of the vehicle in which vehicle telematics system 400 is used. Such location information may also be used by the probabilistic routing software stored in the storage device 406 to perform the probabilistic routing method according to the present invention. RF communication device 416 may be any type of RF wireless communication interface, such as a cellular telephone interface, and has a transmission range R as explained above. RF communication interface 416 is used to transmit packets to other vehicles in the VANET determined for packet forwarding according to the probabilistic routing method of the present invention. In addition, RF communication interface 416 is used to broadcast the beacon signals to other vehicles in the vicinity to inform the other vehicles of the current location of the vehicle in which the vehicle telematics system 400 is used, as determined by the GPS device 414.

Figure 5:
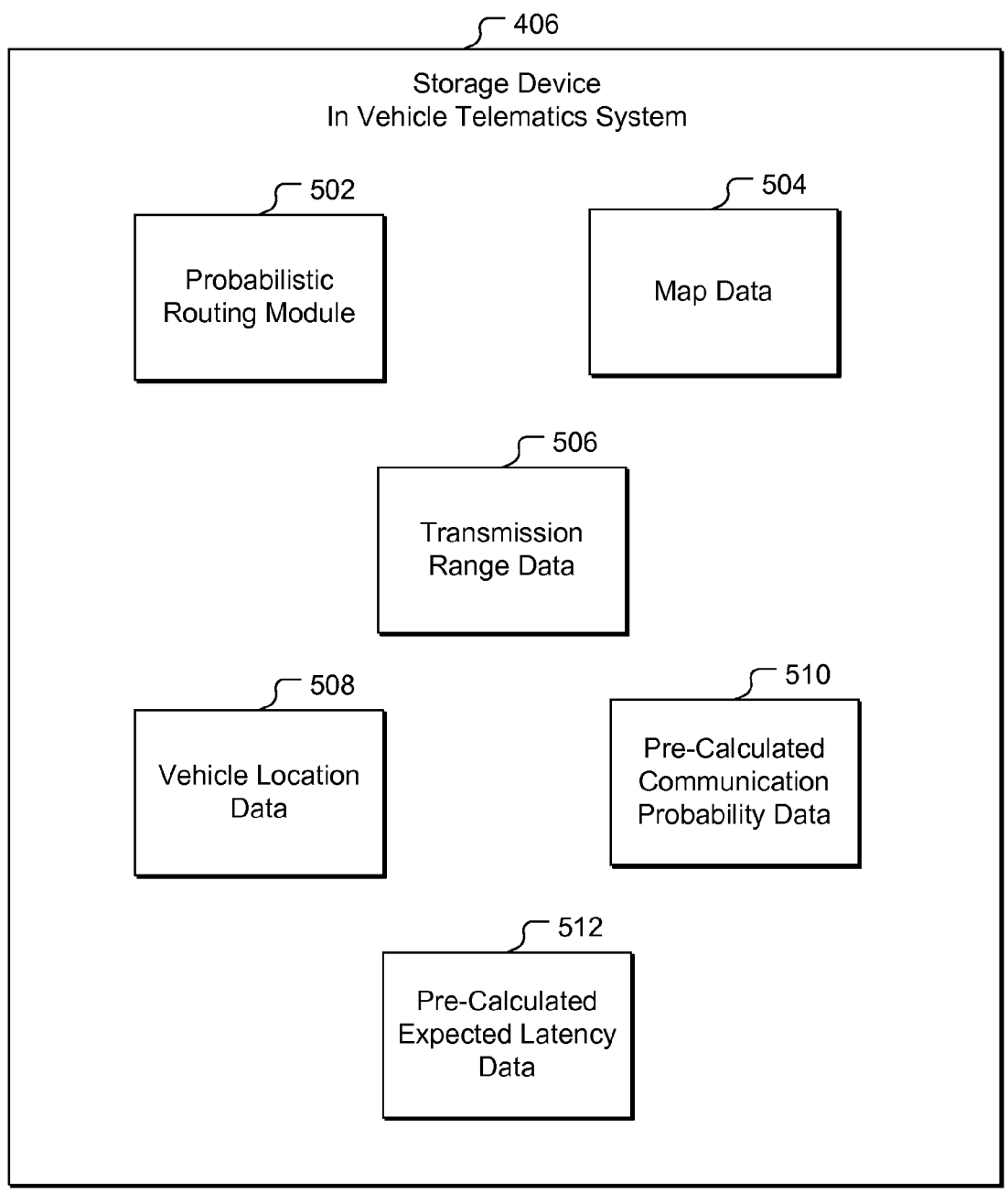
FIG. 5 illustrates the software modules and data stored in the vehicle telematics system in which the method of VANET routing is implemented, according to one embodiment of the present invention.

FIG. 5 illustrates the software modules and data stored in the vehicle telematics system in which the method of VANET routing is implemented, according to one embodiment of the present invention. The software modules include probabilistic routing module 502, map data 504, transmission range data 506, vehicle location data 508, pre-calculated communication probability data 510, and pre-calculated expected latency data 512, and are implemented as computer instructions or computer data stored in storage device 406 and configured to cause processor 402 to operate in accordance with the various embodiments of the present invention as explained above. Other vehicle telematics software modules (not shown herein) may also be present in the storage device 406.

Probabilistic routing module 502 includes software instructions corresponding to the probabilistic routing method of the present invention explained above and with reference to FIG. 3A and/or FIG. 3B. Map data 504 stores geographic map data for use by the probabilistic routing module 502 to perform the probabilistic routing method of the present invention explained above and with reference to FIG. 3A. Transmission range data 506 stores information on the transmission range of the radio communication devices in the VANET for use by the probabilistic routing module 502 to perform the probabilistic routing method of the present invention explained above and with reference to FIG. 3A and/or FIG. 3B. Vehicle location data 508 are the current locations of the vehicles in the vicinity, as determined by the beacon signals received from such nearby vehicles, for use by the probabilistic routing module 502 to perform the probabilistic routing method of the present invention explained above and with reference to FIG. 3. Pre-calculated communication probability data 510 and pre-calculated expected latency data 512 are the communication probability data and the expected latency data, respectively, that were pre-calculated according to step 304 and step 306, respectively, of FIG. 3A and pre-stored in storage device 406, for use by the probabilistic routing module 502 to select the vehicles to which packets should be forwarded according to the probabilistic routing method of the present invention explained above and with reference to FIG. 3B.

Upon reading this disclosure, those of skill in the art will appreciate still additional alternative designs for probabilistic routing of packets in a VANET. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a vehicular ad hoc network (VANET) in which a packet is to be wirelessly transmitted from a first vehicle to a destination, a method of determining a second vehicle among a plurality of vehicles in the VANET to which the packet is to be forwarded from the first vehicle, the method comprising the steps of:
   at the first vehicle, determining the second vehicle to forward the packet from the first vehicle based on pre-calculated expected latency data corresponding to the next vehicle, the pre-calculated expected latency data indicative of an expected latency for communication of the packet from the first vehicle to the destination if the packet is forwarded from the first vehicle to the second vehicle, the pre-calculated expected latency data having been calculated in advance of said step of determining the second vehicle during a pre-compute phase prior to run-time, wherein the step of determining the second vehicle to forward the packet comprises the step of:
      applying a utility function to the pre-calculated expected latency data corresponding to a plurality of vehicles in the VANET located within a transmission range of a wireless communication device of the first vehicle to obtain a plurality of real numbers each corresponding to the plurality of vehicles;
   selecting at least one of the plurality of vehicles based on the real number as the second vehicle to forward the packet; and
   wherein the second vehicle to forward the packet is determined based on pre-calculated communication probability data corresponding to the second vehicle in addition to the pre-calculated expected latency data, the communication probability data having been calculated in advance of said step of determining the second vehicle during the pre-compute phase prior to the run-time and being indicative of probability that there exists a communication path from the first vehicle to neighbors of the destination within a transmission range of a wireless communication device of the first vehicle, within a predetermined time and within a predetermined number of hops between the vehicles in the VANET, if the packet is forwarded from the first vehicle to the second vehicle; and
   wherein the utility function $f$ is $f=\alpha\tau(x,d)+(1-\alpha)\rho(x,d,T)$, where x is a current location of the first vehicle or the plurality of vehicles, d is the location of the destination, $\tau(x,d)$ is the latency of communication from the current location x to the destination d, $\alpha$ is a positive weight constant less than 1, T is a time limit, and $\rho$ is a pre-computed communication probability, and at least one of the plurality of vehicles with a smallest value of the real number of the utility function $f$ is selected as the second vehicle; and
   forwarding the packet from the source vehicle to the determined second vehicle.

2. The method of claim 1, wherein the expected latency $$\tau(x, d) = T\rho(x, d, T) - \sum_{t=0}^{T-1} \rho(x, d, t)$$

where T is the predetermined time and $\rho(x,d,T)$ is the communication probability corresponding to the second vehicle, the first vehicle x, and the destination d.

3. The method of claim 1, wherein the communication probability corresponding to the second vehicle is determined as a function of hop probabilities corresponding to a plurality of hypothetical positions in the VANET, the hop probabilities indicative of probabilities that the plurality of vehicles will move locations in the VANET.

4. The method of claim 3, wherein the communication probability $\rho(s,d,T)$ is determined by performing the steps of:
   (a) for every position $x \in M$ and time $t \leq T$, do Answer (x, t, 0)=0;
   (b) Answer (s, 0, 0)=1;
   (c) for k=1 to H do
      (c-1) for every space-time (x, t) do
         (c-1-1) Answer(x,t,k)=P((s,0),(x,t));
         (c-1-2) for every other space-time (x',t') such that $t' \leq t$ and every R-neighbor $x_R$ of x' do
            (c-1-2-1) p=Answer (x',t',k−1)·P(($x_R$,t'), (x,t));
            (c-1-2-2) Answer (x, t, k)=Answer (x, t, k)(1−p)+p;
   (d) return $$\rho(s, d, T) = 1 - \Pi_{\substack{d_R \in D \\ t \leq T}}(1 - \text{Answer}\ (d_R, t, H)),$$

where D is the set of all R-neighbors of d,
where T is the predetermined time, H is the predetermined number of hops, M is a map with m positions, R is a transmission range of radio devices in each car in the VANET, P ($u_1$, $u_2$) is a hop probability that there is a car that appears at $u_1$ and moves to $u_2$, s is the first vehicle, and d is the destination, and Answer (x, t, k) is a variable with a final value of Answer (x, t, k) in said step (c-1-2-2) corresponding to a probability that there exists a communication path from location (s, 0) to location (x, t) with at most k hops on the map M.

5. The method of claim 3, wherein the hop probabilities are obtained from field data obtained from actual measurements.

6. The method of claim 3, wherein the hop probabilities are obtained from traffic simulations.

7. The method of claim 6, wherein the hop probabilities are obtained by simulating probabilistic movements of vehicles in the VANET using intersection probabilities indicative of cars changing directions at intersections.

8. The method of claim 1, wherein the communication probability data or the expected latency data corresponding to a plurality of locations in the VANET are stored in a look-up table in the first vehicle.

9. A system for use in a vehicular ad hoc network (VANET) in which a packet is to be wirelessly transmitted from a first vehicle to a destination, the system including a processor and a tangible non-transitory computer readable storage medium storing computer instructions adapted to perform a method of determining a second vehicle among a plurality of vehicles in the VANET to which the packet is to be forwarded from the first vehicle, the method comprising the steps of:
  at the first vehicle, determining the second vehicle to forward the packet from the first vehicle based on pre-calculated expected latency data corresponding to the second vehicle, the pre-calculated expected latency data indicative of an expected latency for communication of the packet from the first vehicle to the destination if the packet is forwarded from the first vehicle to the second vehicle, the pre-calculated expected latency data having been calculated in advance of said step of determining the second vehicle during a pre-compute phase prior to run-time, wherein the step of determining the second vehicle to forward the packet comprises the step of:
    applying a utility function to the pre-calculated expected latency data corresponding to a plurality of vehicles in the VANET located within a transmission range of a wireless communication device of the first vehicle to obtain a plurality of real numbers each corresponding to the plurality of vehicles;
  selecting at least one of the plurality of vehicles based on the real number as the second vehicle to forward the packet; and
  wherein the second vehicle to forward the packet is determined based on pre-calculated communication probability data corresponding to the second vehicle in addition to the pre-calculated expected latency data, the communication probability data having been calculated in advance of said step of determining the second vehicle during the pre-compute phase prior to the run-time and being indicative of probability that there exists a communication path from the first vehicle to neighbors of the destination within a transmission range of a wireless communication device of the first vehicle, within a predetermined time and within a predetermined number of hops between the vehicles in the VANET, if the packet is forwarded from the first vehicle to the second vehicle; and
  wherein the utility function $f$ is $f=\alpha\tau(x,d)+(1-\alpha)\rho(x,d,T)$, where x is a current location of the first vehicle or the plurality of vehicles, d is the location of the destination, $\tau(x,d)$ is the latency of communication from the current location x to the destination d, $\alpha$ is a positive weight constant less than 1, T is a time limit, and $\rho$ is a pre-computed communication probability, and at least one of the plurality of vehicles with a smallest value of the real number of the utility function $f$ is selected as the second vehicle; and
  forwarding the packet from the first vehicle to the determined second vehicle.

10. The system of claim 9, wherein the expected latency $$\tau(x, d) = T\rho(x, d, T) - \sum_{t=0}^{T-1} \rho(x, d, t),$$

where T is the predetermined time and $\rho(x,d,T)$ is the communication probability corresponding to the second vehicle, the first vehicle x, and the destination d.

11. The system of claim 9, wherein the communication probability corresponding to the second vehicle is determined as a function of hop probabilities for a plurality of hypothetical positions in the VANET, the hop probabilities indicative of probabilities that the plurality of vehicles will move locations in the VANET.

12. The system of claim 11, wherein the communication probability $\rho(s,d,T)$ is determined by performing the steps of:
  (a) for every position x∈M and time t≦T, do Answer (x, t, 0)=0;
  (b) Answer (s, 0, 0)=1;
  (c) for k=1 to H do
    (c-1) for every space-time (x,t) do
      (c-1-1) Answer(x,t,k)=P((s,0),(x,t));
      (c-1-2) for every other space-time (x',t') such that t'≦t and every R-neighbor $x_R$ of x' do
        (c-1-2-1) p=Answer (x',t',k−1)·P(($x_R$,t'),(x,t)); and
        (c-1-2-2) Answer (x, t, k)=Answer (x, t, k) (1−p)+p;
  (d) return $$\rho(s, d, T) = 1 - \Pi_{\substack{d_R \in D \\ t \le T}}(1 - \text{Answer } (d_R, t, H)),$$

where D is the set of all R-neighbors of d,
where T is the predetermined time, H is the predetermined number of hops, M is a map with m positions, R is a transmission range of radio devices in each car in the VANET, P($u_1,u_2$) is a hop probability that there is a car that appears at $u_1$ and moves to $u_2$, s is the first vehicle, and d is the destination, and Answer (x, t, k) is a variable with a final value of Answer (x, t, k) in step (c-1-2-2) corresponding to a probability that there exists a communication path from location (s, 0) to location (x, t) with at most k hops on the map M.

13. The system of claim 11, wherein the hop probabilities are obtained from field data obtained from actual measurements.

14. The system of claim 11, wherein the hop probabilities are obtained from traffic simulations.

15. The system of claim 14, wherein the hop probabilities are obtained by simulating probabilistic movements of vehicles in the VANET using intersection probabilities indicative of cars changing directions at intersections.

16. The system of claim 9, wherein the computer readable medium stores the communication probability data or the expected latency data corresponding to a plurality of locations in the VANET in a look-up table.

* * * * *